(12) United States Patent
Wu

(10) Patent No.: US 9,128,898 B2
(45) Date of Patent: Sep. 8, 2015

(54) SERVER AND METHOD FOR MANAGING REDUNDANT ARRAY OF INDEPENDENT DISK CARDS

(71) Applicant: HON HAI PRECISION INDUSTRY CO., LTD., New Taipei (TW)

(72) Inventor: Chih-Huang Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 259 days.

(21) Appl. No.: 13/859,568

(22) Filed: Apr. 9, 2013

(65) Prior Publication Data

US 2014/0115236 A1 Apr. 24, 2014

(30) Foreign Application Priority Data

Oct. 23, 2012 (TW) .............................. 101139155 A

(51) Int. Cl.
| | | |
|---|---|---|
| G06F 11/00 | (2006.01) | |
| G06F 11/16 | (2006.01) | |
| G06F 11/20 | (2006.01) | |
| G06F 12/06 | (2006.01) | |
| G06F 11/10 | (2006.01) | |

(52) U.S. Cl.
CPC ........ *G06F 11/2005* (2013.01); *G06F 11/2028* (2013.01); *G06F 11/2046* (2013.01); *G06F 11/1076* (2013.01); *G06F 12/0646* (2013.01); *G06F 12/0684* (2013.01)

(58) Field of Classification Search
CPC ... G06F 11/20; G06F 11/202; G06F 11/2023; G06F 11/2028; G06F 11/2038; G06F 11/2033; G06F 11/2005; G06F 11/2017; G06F 11/2041; G06F 11/2046
See application file for complete search history.

(56) References Cited

U.S. PATENT DOCUMENTS

| | | | | |
|---|---|---|---|---|
| 8,074,105 | B2 * | 12/2011 | Kalwitz et al. | 714/6.22 |
| 8,219,719 | B1 * | 7/2012 | Parry et al. | 710/8 |
| 2006/0194386 | A1 * | 8/2006 | Yao et al. | 438/257 |
| 2006/0224767 | A1 * | 10/2006 | Taeshima | 709/234 |
| 2009/0007155 | A1 * | 1/2009 | Jones et al. | 719/327 |
| 2009/0037555 | A1 * | 2/2009 | Ueno et al. | 709/213 |
| 2009/0037638 | A1 * | 2/2009 | Izuta et al. | 710/316 |
| 2009/0150643 | A1 * | 6/2009 | Jones et al. | 711/203 |

(Continued)

OTHER PUBLICATIONS

Dixit, Bhanu Prakash. Tiwari, Sanjay. Vaze, Kedar. Trickey III, Joe H. Introducing the Dell PERC 6 Family of SAS RAID Controllers. May 2008. Dell Inc. Dell Power Solutions. pp. 88-93.*

*Primary Examiner* — Gabriel Chu
*Assistant Examiner* — Paul Contino
(74) *Attorney, Agent, or Firm* — Novak Druce Connolly Bove + Quigg LLP

(57) ABSTRACT

In a method for managing redundant array of independent disk (RAID) cards, physical layer (PHY) chips of the RAID card is detected by a serial port. Information of a malfunctioning PHY chip and a standby PHY chip is read and stored in a firmware of a flash erasable programmable read only memory (EPROM) of the RAID card. An address of the malfunctioning PHY chip is set as an address of the standby PHY chip, and a hard disk electronically connected to the malfunctioning PHY chip is connected to the standby PHY chip. A new serial attached small computer system interface (SAS) address is obtained by amending an original SAS address according to the number and address of the standby PHY chip, and a new firmware is created in the flash EPROM according to the new SAS address.

9 Claims, 3 Drawing Sheets

(56) References Cited

U.S. PATENT DOCUMENTS

| | | | |
|---|---|---|---|
| 2010/0122111 A1* | 5/2010 | Allen et al. | 714/3 |
| 2011/0185226 A1* | 7/2011 | Douchi et al. | 714/6.22 |
| 2013/0151886 A1* | 6/2013 | Wu | 714/5.1 |
| 2013/0159558 A1* | 6/2013 | Wu | 710/9 |
| 2013/0159606 A1* | 6/2013 | Wu | 711/103 |
| 2013/0275802 A1* | 10/2013 | Endo et al. | 714/6.23 |

* cited by examiner

SERVER AND METHOD FOR MANAGING REDUNDANT ARRAY OF INDEPENDENT DISK CARDS

BACKGROUND

1. Technical Field

Embodiments of the present disclosure generally relate to redundant array of independent disk (RAID) cards, and particularly to a server and a method for managing the RAID cards.

2. Description of Related Arts

Presently, if a physical layer (PHY) chip of a RAID card malfunctions, the entire RAID card may need to be replaced. In this situation, data stored in the RAID card may be lost or damaged.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language. One or more software instructions in the modules may be embedded in hardware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
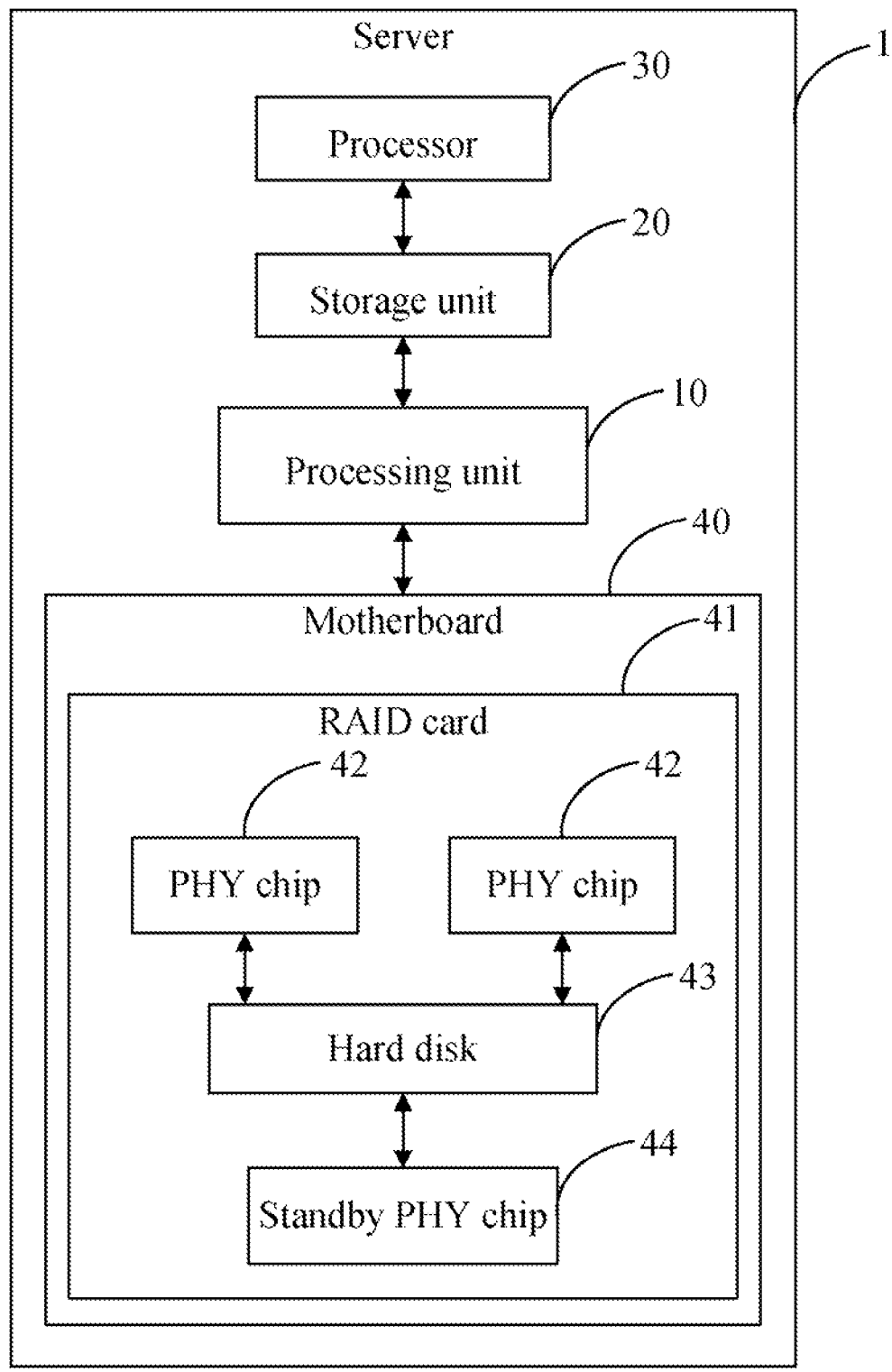
FIG. 1 is a schematic diagram of one embodiment of a server.

FIG. 1 is a schematic diagram of one embodiment of a server 1. In the embodiment, the server 1 includes a processing unit 10, a storage unit 20, a processor 30, and a motherboard 40. The motherboard 40 includes one or more redundant array of independent disk (RAID) cards 41, and each of the one or more RAID cards 41 includes one or more physical layer (PHY) chips 42. The one or more PHY chips 42 are electronically connected to one or more hard disks 43. In the embodiment, the RAID card 41 further includes one or more standby PHY chips 44. The standby PHY chip 44 is for replacing a malfunctioning PHY chip 42.

Figure 2:
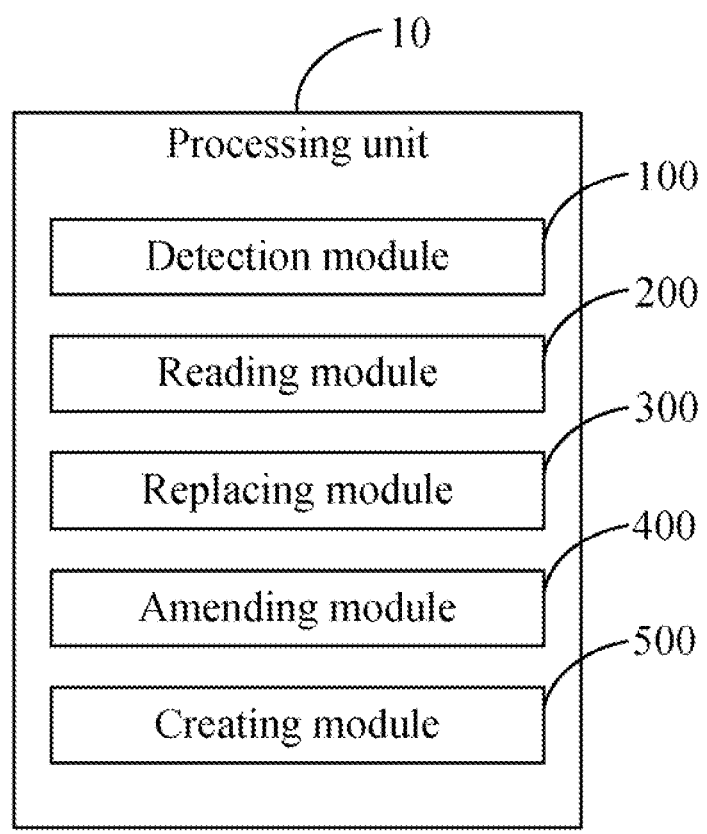
FIG. 2 is a block diagram of one embodiment of function modules of a processing unit of the server in FIG. 1.

In one embodiment, the processing unit 10 may include one or more function modules (as shown in FIG. 2). The one or more function modules may comprise computerized code in the form of one or more programs that are stored in the storage unit 20, and executed by the processor 30 to provide the functions of the processing unit 10. The storage unit 20 is a dedicated memory, such as an EPROM or a flash memory.

FIG. 2 is a block diagram of one embodiment of the function modules of the processing unit 10. In one embodiment, the processing unit 10 includes a detection module 100, a reading module 200, a replacing module 300, an amending module 400, and a creating module 500. A detailed description of the functions of the modules 100-500 is given with reference to FIG. 3.

Figure 3:
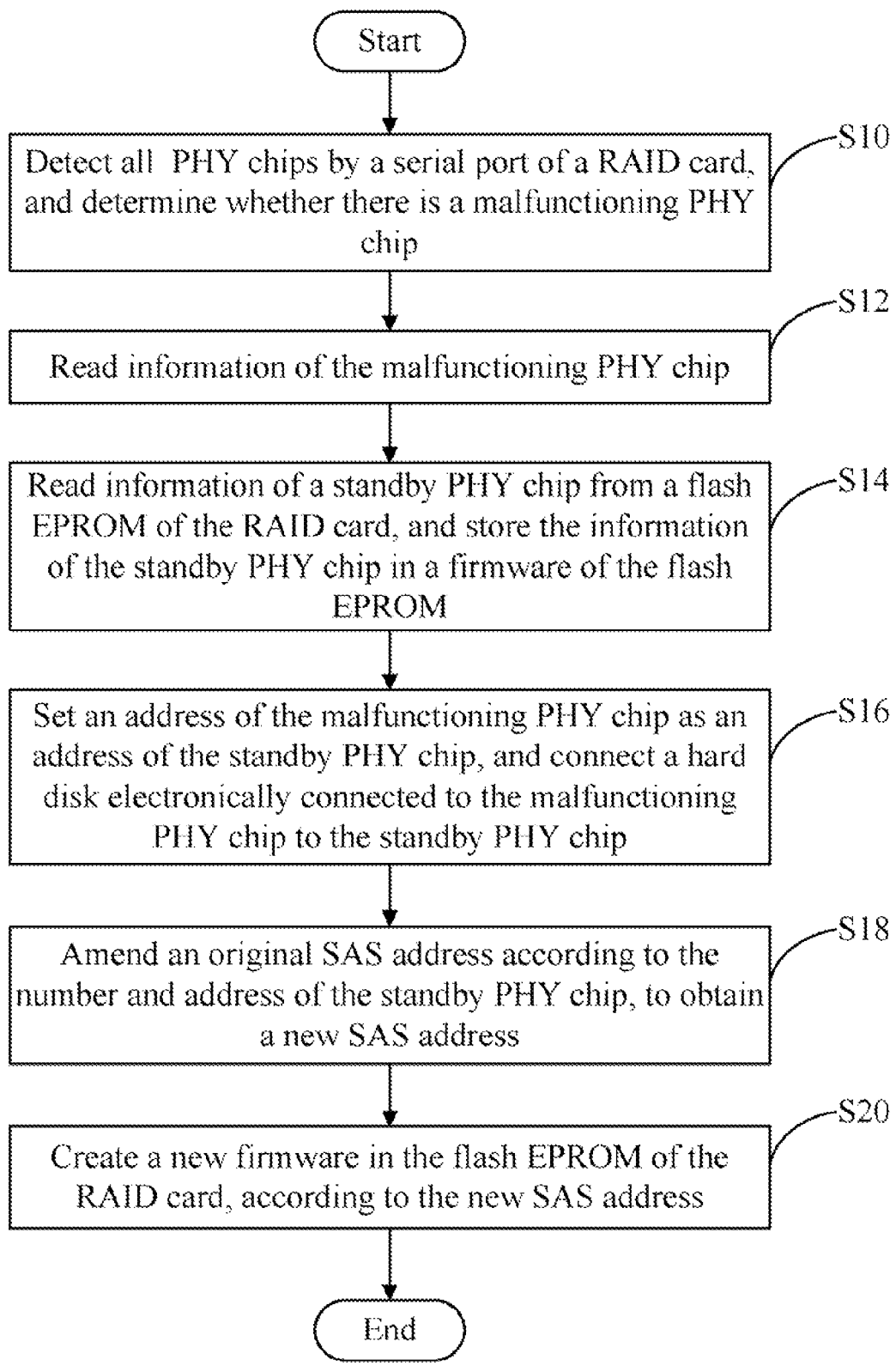
FIG. 3 is a flowchart of one embodiment of a method for managing RAID cards.

FIG. 3 is a flowchart of one embodiment of a method for managing the RAID cards 41. Depending on the embodiment, additional steps may be added, others removed, and the ordering of the steps may be changed, all steps progress in even numbers only.

In step S10, the detection module 100 detects all of the PHY chips 42 by a serial port of the RAID card 41, and determines whether there is a malfunctioning PHY chip 42. The malfunctioning PHY chip 42 may have one or more hardware or software problems associated with the PHY chip 42, such as a damage of the PHY chip 42, for example.

In step S12, when a malfunctioning PHY chip 42 is detected, the reading module 200 reads information of the malfunctioning PHY chip 42. The information includes a number and an address of the malfunctioning PHY chip 42, and is stored in a firmware of a flash EPROM of the RAID card 41. In the embodiment, numbers and addresses of eight PHY chips 42 constitute a serial attached small computer system interface (SAS) address, and the addresses of the eight PHY chips 42 are independent from each other. The SAS address includes eight parallel paths for transmitting data.

For example, there are eight PHY chips 42 in the RAID card 41, numbered from PHY__0, PHY__1, PHY__2, PHY__3, PHY__4, PHY__5, PHY__6 to PHY__7. Address of the "PHY__0" is 5865530000, address of the "PHY__1" is 5865530001, address of the "PHY__2" is 5865530002, address of the "PHY__3" is 5865530003, address of the "PHY__4" is 5865530004, address of the "PHY__5" is 5865530005, address of the "PHY__6" is 5865530006, and address of the "PHY__7" is 5865530007. The numbers and addresses of the eight PHY chips 42 constitute a SAS address. If the detection module 100 detects the "PHY__2" is malfunctioning, the reading module 200 reads information of the "PHY__2", including the number "PHY__2" and the address "5865530002".

In step S14, the reading module 200 further reads information of the standby PHY chip 44 from the flash EPROM of the RAID card 41, and stores the information of the standby PHY chip 44 in the firmware of the flash EPROM. The information of the standby PHY chip 44 includes a number of the standby PHY chip 44, for example. For example, if the standby PHY chip is numbered PHY__50, the reading module 200 reads the number "PHY__50" and stores the number "PHY__50" in the firmware.

In step S16, the replacing module 300 sets the address of the malfunctioning PHY chip 42 as the address of the standby PHY chip 44, and connects the hard disk 43 electronically connected to the malfunctioning PHY chip 42 to the standby PHY chip 44. For example, the replacing module 300 sets the address of the "PHY__2" (i.e., 5865530002) as the address of the "PHY__50", and connects the hard disk 43 to the "PHY__50". In the embodiment, the replacing module 300 may connect the hard disk 43 to the standby PHY chip 44 using a switch (not shown in FIG. 1) of the RAID card 41.

In step S18, the amending module 400 amends an original SAS address according to the number and address of the standby PHY chip 44, to obtain a new SAS address. In detail, the amending module 400 replaces the number and address of the malfunctioning PHY chip 42 in the original SAS address with the number and address of the standby PHY chip 44. The original SAS address is the SAS address before detecting the malfunctioning PHY chip 42.

For example, the amending module 400 replaces the number "PHY__2" and the address "5865530002" in the original SAS address with the number "PHY__50" and the address "5865530002", to obtain the new SAS address. Then numbers and addresses of the present eight PHY chips 42 are as follows: the address of the "PHY_0" is 5865530000, the address of the "PHY__1" is 5865530001, the address of the "PHY__50" is 5865530002, the address of the "PHY__3" is 5865530003, the address of the "PHY__4" is 5865530004, the address of the "PHY__5" is 5865530005, the address of the "PHY__6" is 5865530006, and the address of the "PHY__7" is 5865530007.

In step S20, the creating module 500 creates a new firmware in the flash EPROM of the RAID card 41, according to the new SAS address. Then the data can be transmitted to the hard disk 43, and there is no need to replace the whole RAID card 41.

It is understood that in other embodiments, if more than one PHY chip 42 is malfunctioning, the replacing module 300 may set addresses of more than one standby PHY chip 44 according to addresses of the malfunctioning PHY chips 42, and connect the hard disks 43 which were electronically connected to the malfunctioning PHY chips 42 to the standby PHY chips 44. The amending module 400 may replace the numbers and addresses of the malfunctioning PHY chips 42 in an original SAS address with the numbers and addresses of the standby PHY chips 44, to obtain a new SAS address.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method being executed by a processor of an electronic device, the method comprising:
   (a) detecting physical layer (PHY) chips of a redundant array of independent disk (RAID) card in a motherboard of the electronic device by a serial port of the RAID card;
   (b) in response to detecting a malfunctioning PHY chip, reading information of the malfunctioning PHY chip and storing the information of the malfunctioning PHY chip in a firmware of a flash erasable programmable read only memory (EPROM) of the RAID card;
   (c) reading information of a standby PHY chip of the RAID card from the flash EPROM, and storing the information of the standby PHY chip in the firmware of the flash EPROM;
   (d) setting an address of the malfunctioning PHY chip as an address of the standby PHY chip, and connecting a hard disk electronically connected to the malfunctioning PHY chip to the standby PHY chip;
   (e) obtaining a new serial attached small computer system interface (SAS) address by amending an original SAS address according to the number and address of the standby PHY chip; and
   (f) creating a new firmware in the flash EPROM according to the new SAS address.

2. The method as claimed in claim 1, wherein the SAS address consists of numbers and addresses of eight PHY chips and comprises eight parallel paths for transmitting data.

3. The method as claimed in claim 1, wherein in step (d), the hard disk is electronically connected to the standby PHY chip using a switch of the RAID card.

4. A non-transitory storage medium storing a set of instructions, the set of instructions being executed by a processor of an electronic device, to perform a method comprising:
   (a) detecting physical layer (PHY) chips of a redundant array of independent disk (RAID) card in a motherboard of the electronic device by a serial port of the RAID card;
   (b) in response to detecting a malfunctioning PHY chip, reading information of the malfunctioning PHY chip and storing the information of the malfunctioning PHY chip in a firmware of a flash erasable programmable read only memory (EPROM) of the RAID card;
   (c) reading information of a standby PHY chip of the RAID card from the flash EPROM, and storing the information of the standby PHY chip in the firmware of the flash EPROM;
   (d) setting an address of the malfunctioning PHY chip as an address of the standby PHY chip, and connecting a hard disk electronically connected to the malfunctioning PHY chip to the standby PHY chip;
   (e) obtaining a new serial attached small computer system interface (SAS) address by amending an original SAS address according to the number and address of the standby PHY chip; and
   (f) creating a new firmware in the flash EPROM according to the new SAS address.

5. The non-transitory storage medium as claimed in claim 4, wherein the SAS address consists of numbers and addresses of eight PHY chips and comprises eight parallel paths for transmitting data.

6. The non-transitory storage medium as claimed in claim 4, wherein in step (d), the hard disk is electronically connected to the standby PHY chip using a switch of the RAID card.

7. An electronic device, the electronic device comprising:
   a motherboard comprising one or more redundant array of independent disk (RAID) cards;
   a storage unit;
   at least one processor;
   one or more programs that are stored in the storage unit and are executed by the at least one processor, the one or more programs comprising:
   a detection module that detects physical layer (PHY) chips of the one or more RAID cards;
   a reading module that reads information of a malfunctioning PHY chip and stores the information of the malfunctioning PHY chip in a firmware of a flash erasable programmable read only memory (EPROM) of the RAID card, in response to detecting a malfunctioning PHY chip;
   the reading module further reads information of a standby PHY chip of the RAID card from the flash EPROM, and stores the information of the standby PHY chip in the firmware of the flash EPROM;
   a replacing module that sets an address of the malfunctioning PHY chip as an address of the standby PHY chip, and connects a hard disk electronically connected to the malfunctioning PHY chip to the standby PHY chip;
   an amending module that obtains a new serial attached small computer system interface (SAS) address by amending an original SAS address according to the number and address of the standby PHY chip; and
   a creating module that creates a new firmware in the flash EPROM according to the new SAS address.

8. The electronic device as claimed in claim 7, wherein the SAS address consists of numbers and addresses of eight PHY chips and comprises eight parallel paths for transmitting data.

9. The electronic device as claimed in claim 7, wherein the hard disk is electronically connected to the standby PHY chip using a switch of the RAID card.

* * * * *